Patented Mar. 14, 1944

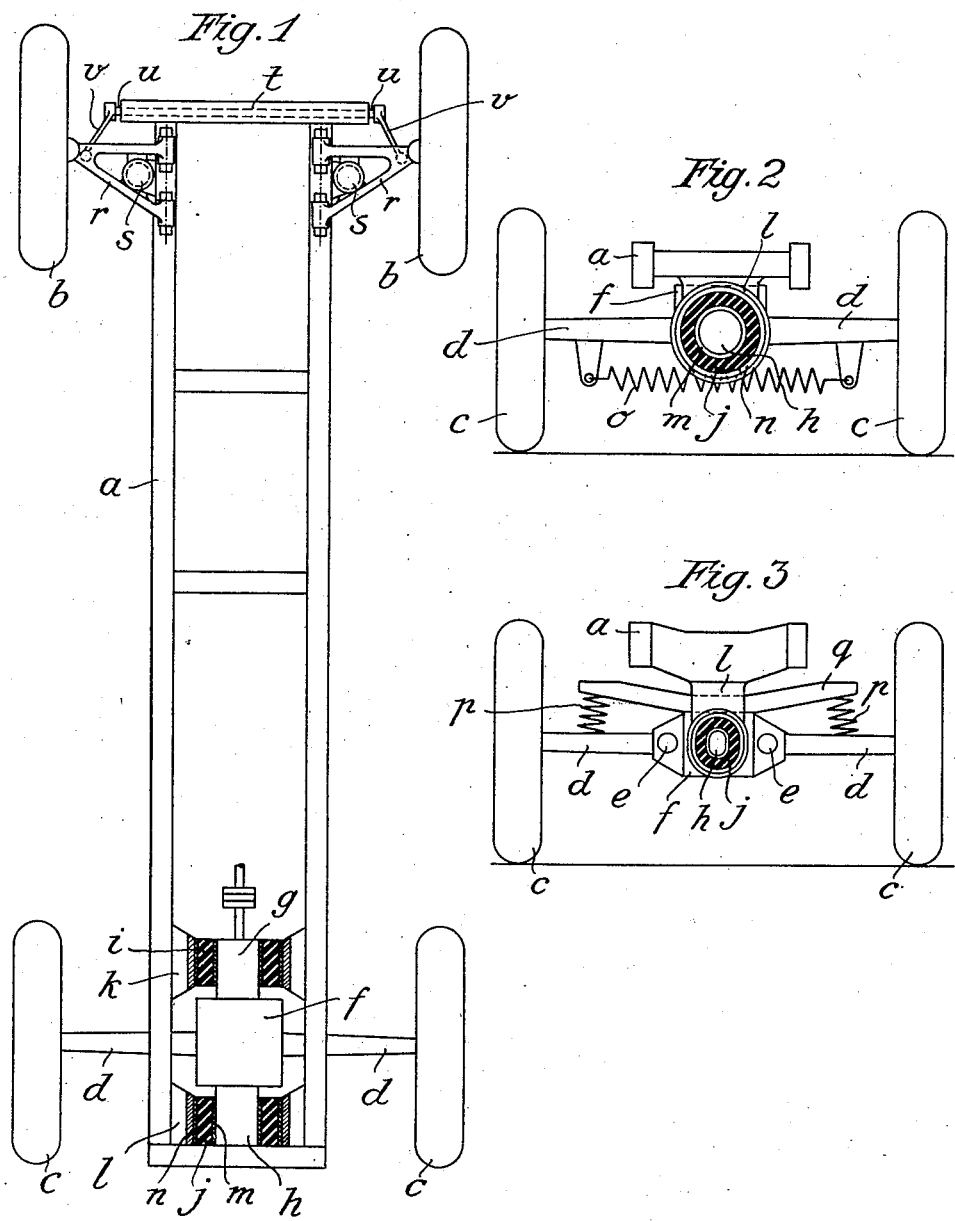

2,344,072

UNITED STATES PATENT OFFICE 2,344,072

VEHICLE HAVING OSCILLATING HALF AXLES

Otto Winkelmann, Stuttgart-Degerloch, Germany; vested in the Alien Property Custodian Application October 8, 1941, Serial No. 414,042
In Germany June 6, 1940

5 Claims. (Cl. 180—73)

The present invention relates to vehicles, more particularly to motor vehicles having oscillating or pendulum half axles. Motor vehicles of this kind often tend to oscillate about the frame or the car body, to perform the so-called rocking which may hardly be obviated by larger dimensioning the oscillating members. This latter method, besides causing an undesired increase in the weight of the vehicle and a too rigid and torsional stiff frame, has the drawback of an undamped transmission of shocks and noises.

The present invention provides an increase of the torsional elasticity between the axles of the vehicle to reduce the natural vibrations of the car system about its longitudinal axis, so that the vibrating movements are no longer experienced by the passengers to be troublesome, but appear in the form of weak slowly occurring amplitudes. To this purpose the axle aggregate, consisting more particularly of pendulum half axles, is connected to the rest of the vehicle by the interposition of elastic members, for instance rubber buffers, in a manner to be elastically rotatable about a longitudinal axis, the springs, serving the purpose of shock absorption of the wheels, and the rubber buffers being connected one after the other (therefore in series) in the direction of the transmission of forces from the wheels to the car body. Hereby simultaneously the transmission of shocks and noises from the wheels to the frame or the car body is prevented.

A further reduction of the oscillating phenomenons may be obtained by arranging the springs, absorbing the shocks of the wheels, in such a manner that they act as compensating springs, totally or partially flexing due to oppositely directed or unequal large lifting movements of the wheels of a wheel axle without exerting upon the car body or the supporting member carrying the members guiding the wheel a force returning these elements (direction force). The wheels for this purpose are thus arranged relatively to each other so that they mutually absorb their shocks.

By the torsional elastic connection of the axle aggregate to the rest of the vehicle, however, the lifting action exerted upon the car body on lateral inclinations of the latter and thereby the inclination of the car body when taking curves is reduced, more particularly if compensating springs are provided at this axle. To increase this safety in taking curves, however, the other axle preferably may be provided with an additional spring arrangement, for instance a so-called balancer, aiding in maintaining upright the car body.

If it is, however, desirable to reduce only relatively slightly the lifting action exerted upon the car body by the axle torsionally elastically connected to the rest of the vehicle, or, if the torsional elasticity of the connection is sufficient to remove the undesired oscillating phenomenons, the springs, absorbing the shocks of the wheels, may also bear against the supporting member, for instance a differential gear, which carries the pendulum half axles and torsionally elastically is connected to the rest of the vehicle. In this case, on lateral inclinations of the car body and thereby of the supporting member also with an amplitude admitted by the torsional elasticity provided between the supporting member and the rest of the vehicle, the springs absorbing the shocks of the wheels also act in maintaining car body upright.

To effect the torsional elastic connection of the supporting member, for instance the differential gear casing, carrying the pendulum half axles or the like, to the rest of the vehicle, preferably rubber rings of annular, oval or similar form or pneumatic devices, or other elastic members constructed and arranged in such a manner are provided which particularly with the elements to be united together, are adhesively connected and effect a resiliency essentially or exclusively in the direction of rotation about a longitudinal axis, these resilient or elastic members preferably being arranged in front and in rear of the oscillating or pendulum half axles.

In the accompanying drawing some constructions according to the invention are shown diagrammatically and by way of example.

In this drawing:

Fig. 1 is a plan view of a vehicle frame provided with a rear axle aggregate torsionally elastically arranged at the frame and a front wheel suspension employing an additional spring arrangement for setting upright the carriage body, Fig. 2 is a rear elevation of the rear axle aggregate according to Fig. 1, and Fig. 3 is a rear view of a modification of the rear axle aggregate of the construction shown in Fig. 1.

Connected to the frame $a$ are the front wheels $b$ and the rear wheels $c$ which latter are mounted upon oscillating or pendulum half axles $d$. These half axles are linked to the vehicle, as shown for instance in Fig. 3, by means of pivots $e$ to the differential gear casing $f$. The latter is provided with projections $g$ and $h$ directed forwardly and rearwardly respectively which extend in the longitudinal direction of the vehicle and are surrounded by rubber rings $i$ and $j$ respectively inserted in corresponding bearing eyes $k$ and $l$ respectively of the frame. The rubber rings preferably are adhesively connected, for instance by vulcanization, to inner and outer metal sleeves $m$ and $n$ respectively. The inner metal sleeves $m$ are fixed to the projections $g$ and $h$ respectively, the outer metal sleeves $n$ to the bearing eyes $k$ and $l$ respectively of the frame.

In the construction of the rear axle according to Fig. 2, the rubber rings have circular cross section. To absorb the shocks of the wheels one or more tension springs $o$ are provided, the two ends of which are connected to projections of the half axles $d$. The springs $o$ are so arranged that the two half axles $d$ mutually absorb the shocks acting upon the wheels supported by these half axles. In a manner known per se a so-called compensating action of the springs, absorbing the shocks of the wheels, is obtained hereby.

According to the construction of the rear axle shown in Fig. 3 the springs, absorbing the shocks of the wheels or the half axles respectively, and constructed for instance as non-guided helical springs bear with their upper ends against a beam $q$ fixed to the differential casing $f$ and, therefore, together with the latter is mounted by means of the rubber rings $i$ and $j$ in a torsional elastic manner with regard to the rest of the vehicle. In the present case the rubber rings have an oval cross section so as to effect a progressively increasing elastic resistance when the differential gear casing, serving as supporting member for the oscillating half axles, yields with regard to the frame. A particularly large initial resiliency may thereby be chosen without the total resiliency assuming inadmissible large values.

The front wheels $b$ may for instance, in a manner known per se, be suspended from the frame $a$ by two links $r$ arranged one above the other in the manner of link parallelograms and the shocks of these wheels may be absorbed by a helical spring $s$ the lower end of which bears against the lower link and the upper end of which bears against a bearing block fixed to the frame. To increase the safety of the frame when taking curves, a torsional rod-like spring $u$ is, moreover, rotatably mounted in a tubular cross beam $t$ of the frame, upon the ends of which spring levers $v$ are fixed, the free ends of which levers may in any suitable manner be connected to the wheel suspension, for instance to the wheel support or one of the guide links. This torsional rod-like spring $u$ is deformed only if unequal lifting movements of the front wheels occur.

Owing to the torsional elastic connection of the rear axle aggregate to the frame or to the car body respectively by means of the rubber rings $i$ and $j$ unequally directed or unequal large lifting movements of the rear wheels may partially and mutually be compensated without being transmitted to the frame or to the car body respectively. Simultaneously the number of oscillations of the total oscillating system, formed by the frame and the car body as well as by the two axles, about the longitudinal axis of the vehicle is reduced. The absorption of shocks of the rear wheels is weaker, particularly in connection with the construction according to Fig. 2, and shocks and noises are dampened in a most agreeable manner due to metallic contact between axle and frame members or members of the car body respectively being obviated. Simultaneously, however, the torsional rod-like spring $u$, acting as an additional spring for lifting the car body eventually effects a sufficient safety of the frame or the car body in taking curves.

Of course, the invention is not to be limited to the constructional examples shown. For instance, the individual features of the constructions shown in Figs. 2 and 3 could be exchanged one against the other by using for instance in the construction according to Fig. 2 ovally constructed rubber rings or by employing equalizing springs $o$ in the modification shown in Fig. 3 instead of the springs $p$ or additionally thereto. Also instead of rubber rings individual rubber plates or the like arranged in a circle or in a similar manner may be provided.

Instead of the rear axle or simultaneously therewith, the front axle may be torsionally elastically connected to the rest of the vehicle by elastic members.

The torsional elastic connection of the axle aggregate to the rest of the vehicle is of special importance when using gauge altering pendulum half axles. The torsional elastic connection, however, may be employed also in connection with other arrangements of oscillating axles or independent wheel suspensions and eventually in connection with rigid axles too.

Having now particularly described and ascertained the nature of my said invention and in what manner the same is to be performed I declare that what I claim is:

1. In a vehicle having a frame, an axle aggregate including pivoted half-axles and a central member on which said half-axles are pivoted, and means for resiliently mounting said central member from the frame including bearing eyes depending from the frame, projections on said member extending longitudinally of the vehicle into said bearing eyes, and rubber cushions encircling said projections and fitting within said bearing eyes.

2. A vehicle structure as set forth in claim 1 wherein said rubber cushions are adhesively connected to inner and outer metal sleeves and said sleeves are respectively secured to said projections and bearing eyes.

3. A vehicle structure as set forth in claim 1 wherein said projections extend both forwardly and rearwardly from said member whereby rubber cushions are pivoted on opposite sides of the axle aggregate.

4. A vehicle structure as set forth in claim 1 wherein the inner face of the bearing eyes and the rubber cushions are oval in shape.

5. A vehicle structure as set forth in claim 1 wherein said central member of the axle aggregate is a gear-casing at the sides of which the half-axles are pivoted, and springs are provided between the half-axles and lateral projections on the gear-casing for additionally absorbing shocks acting upon the wheels.

OTTO WINKELMANN.